G. FRINK.
THROTTLE VALVE.
APPLICATION FILED JULY 2, 1913.

1,140,738.

Patented May 25, 1915.

WITNESSES:
E. Piterson.
Horace Barnes.

INVENTOR:
Gerald Frink
BY
Pierre Barnes
ATTORNEY

UNITED STATES PATENT OFFICE.

GERALD FRINK, OF SEATTLE, WASHINGTON.

THROTTLE-VALVE.

1,140,738.  Specification of Letters Patent.  Patented May 25, 1915.

Application filed July 2, 1913. Serial No. 776,914.

*To all whom it may concern:*

Be it known that I, GERALD FRINK, a citizen of the United States, residing at Seattle, in the county of King and State of Washington, have invented certain new and useful Improvements in Throttle-Valves, of which the following is a specification.

This invention relates to throttle valves for steam engines which operate under a high steam pressure, and is more especially intended for use with the larger sizes of logging or hoisting engines.

The invention has for its object to improve the construction of valves of this character to enable the valve to be operated under relatively small frictional resistance and afford its maximum opening with but a small movement of the controlling devices therefor.

To these ends, the invention consists in the novel construction and means hereinafter set forth and claimed.

Figures 1, 2:
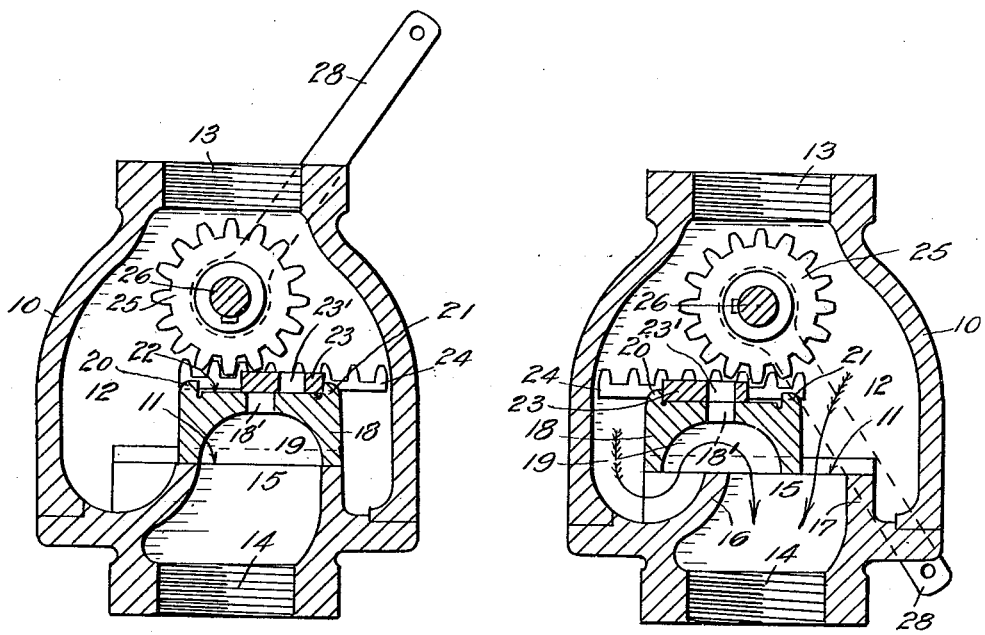
Figures 3, 4, 5:
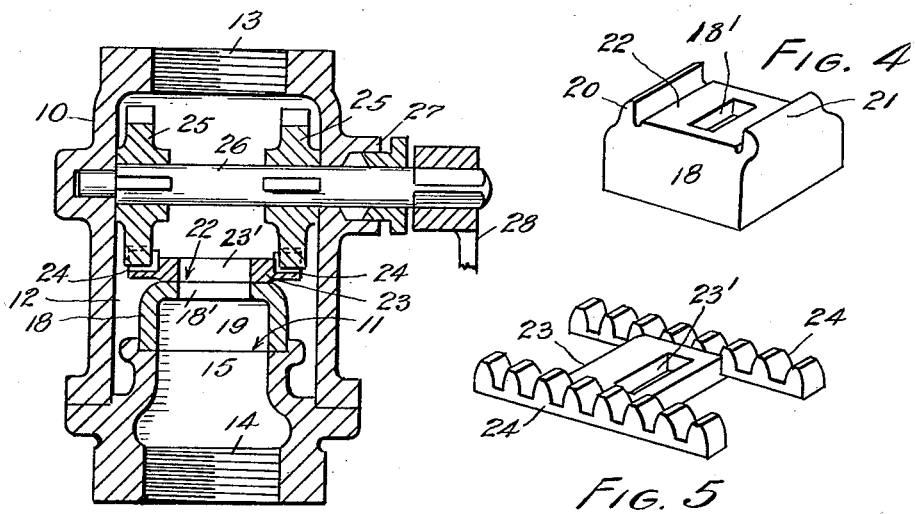

In the drawings accompanying and forming part of this specification, Figure 1 is a longitudinal vertical sectional view of devices embodying the present invention, and showing the valve members in closed positions. Fig. 2 is a similar view with the valve members illustrated in open positions. Fig. 3 is a transverse vertical section of the same. Fig. 4 is a perspective view of the throttle valve proper. Fig. 5 is a like view of the supplemental valve.

The reference numeral 10 designates the valve-body having therein a valve-seat 11 which is disposed at a distance above the bottom of the chamber 12 of the body. The body 10 is provided with a steam inlet 13 which communicates directly with said chamber and has an outlet passage 14 which communicates with the chamber through the port 15 provided in the valve seat. 16 and 17 represent walls inclosing said outlet passage and are arranged as shown with respect to the walls of the body. Slidable upon said seat is a valve 18 having in its underside a cavity 19. Extending upwardly from the ends of the valves are strips or abutments 20 and 21 and intermediate thereof is a seat 22 for a supplemental valve 23 of less length than the distance between the strips 20 and 21.

The valves are respectively provided with ports $18^1$ and $23^1$ which are arranged to be in coincidence when the supplemental valve is moved into proximity to the abutment 20 as illustrated in Fig. 2, and out of register when in the relative positions in which they are shown in Fig. 1. Rigidly connected to or formed integral with the valve 23 at the sides of the latter are rack bars 24. Engaged with the rack bars are toothed gears 25 which are rigidly connected to a shaft 26 which protrudes through a stuffing box 27 in the body to receive an operating handle, such as an arm 28.

As shown in Fig. 1, the valve 18 is closed with respect to the outlet port 15 and the supplemental valve is closed with respect to the valve ports. To open the valves the gears 25 are turned through the agency of the handle 28 to primarily move the supplemental valve 23 and present the valve port $23^1$ in communication with the valve port $18^1$ whereupon the steam flows through such ports into the cavity 19 to afford a pressure from below upon the valve 18 which will act counter to the steam pressure acting upon the valve with a corresponding lessening of the frictional load of the valve. After the supplemental valve encounters the abutment 20 the two valves are moved as a single piece into the position in which they are represented in Fig. 1 with the port 15 open for the admission of steam from both ends of the valve 18 as indicated by feathered arrows in the view. To close the valve, the supplemental valve 23, through the agency of the handle 28, is moved in a contrary direction, first covering the port $18^1$ and then by thrusting against the abutment 21 effecting the shifting of the valve 18 into the position in which it is represented in Fig. 1.

By means of the aforedescribed devices it is evident that the main valve is easily operated and through relatively short strokes.

What I claim, is—

1. In a throttle valve of the class described, the combination with the body having a valve seat disposed at a distance above the bottom of the body chamber, a main slide valve having a port therein and mounted upon said seat, said valve being formed with a cavity in its under side which communicates with said valve-port spaced abutments extending upwardly from the valve, of a supplemental ported valve slidably mounted on the aforesaid valve, rack bars formed integral with the supplemental valve, and means engaging with said bars whereby the supplemental valve is moved to first present the valve ports in register and subsequently effect the movement of the main valve to admit steam from both ends of the valve likewise through the port of the main valves to the port of said seat.

2. In a throttle valve of the class described, the combination with a body having an inlet opening at the top and an outlet opening at the bottom, and spaced walls extending upwardly from the bottom of the body chamber, of a ported main valve slidably mounted upon a seat provided on the upper ends of said walls, said valve being provided with a cavity in its under side, a supplemental valve slidably mounted on the main valve, abutments provided on the main valve and engageable by the supplemental valve, and means whereby said supplemental valve is actuated to primarily uncover the port of the main valve and ultimately cause the main valve to be shifted into position to admit steam from both ends of the valve into the space inclosed by said walls.

3. In a throttle valve of the class described, the combination with the body provided with a valve seat and a main valve having a port therethrough and slidably mounted on said seat, said valve being provided with a cavity in its under-side of a supplemental valve having a port therethrough and slidably mounted on the main valve, means provided on the main valve and engageable by the supplemental valve whereby motion given to the latter will primarily present the ports of the two valves into coincidence and ultimately effect the movement of the main valve into position to admit steam from both ends of the main valve through the port of the valve seat.

Signed at Seattle Wash., this 25th day of June, 1913.

GERALD FRINK.

Witnesses:
E. PETERSON,
HORACE BARNES.

Copies of this patent may be obtained for five cents each, by addressing the "Commissioner of Patents, Washington, D. C."